UNITED STATES PATENT OFFICE.

EDWIN L. SIMPSON, OF MONROE, ASSIGNOR TO HIMSELF AND JARED WILSON POST, OF NEW HAVEN, CONNECTICUT.

IMPROVED COMPOSITION FOR WATERPROOFING FABRICS.

Specification forming part of Letters Patent No. 38,005, dated March 24, 1863.

*To all whom it may concern:*

Be it known that I, EDWIN L. SIMPSON, of Monroe, in the county of Fairfield and State of Connecticut, have invented a new and useful Water-Proof Compound; and I do hereby declare that the following is a full, clear, and exact description thereof.

The nature of my invention consists in producing a water-proof compound free from sulphur or sulphurous ingredients, which when applied will render the articles or fabrics to which it is applied impervious to air or water and free from the offensive odor arising from sulphured or vulcanized goods.

To enable others skilled in the art to prepare and apply my compound, I will proceed to describe my manner of doing the same.

I first melt together in a covered vessel two parts of gutta-percha and three parts of camphene or naphtha over a slow fire, or such a one as will not cause the vapor from the camphene to escape so fast as to waste or take fire, agitating it occasionally until completely combined. I then set it aside to settle and cool. If it be wanted for delicate tints, when partially cooled I thin the fluid still further by adding more camphene or naphtha, as the thinner the fluid the more perfectly will the impurities separate when set aside to settle, which by experiment I find is best done in the sun, in glass vessels, by standing from seven to ten days; but when less purity of the liquid is required artificial heat not exceeding 120° Fahrenheit may be used to advantage. I next prepare a drying-oil by concentrating or boiling linseed or other suitable vegetable oil over a slow fire until it attains the consistency of jelly, when it should be removed and allowed to cool until camphene or naphtha may be added without igniting. I then to four gallons of this concentrated oil add one ounce of cleansed benzoin, and immediately incorporate therewith, by stirring or similar agitation, three gallons of camphene or naphtha, and three gallons of the liquid first prepared, or the same quantity of the liquid as of the camphene or naphtha.

I find by experiment that it requires more or less of the camphene or naphtha, according to the purpose for which the compound is to be used, whether for black or light delicate tints, more in proportion as the tints are to be more delicate. When black is the color desired I mix lamp-black in the oil in such proportions as will make the black required, and when other colors are required the requisite coloring-matter must be used instead of the lamp-black. I also find by experiment that less camphene or naphtha is required when I mix my compound by grinding between iron rollers than is needed when I mix by stirring or agitation, as the grinding process softens the consistency very much more than any other process I have as yet tried.

When my compound is thus fully prepared and thoroughly cool, or not above 70° Fahrenheit, I apply it to such fabrics or materials as I desire to render impervious to air or water, in one or more coats, as the case may require, by spreading in thin coats. I apply it to cloths by the apparatus known as the "Mackintosh spreader," or any other answering the same purpose. For ordinary cloths (cotton) I find three coats are sufficient, and two coats on silk or thin goods. After these coats have become thoroughly dried by being hung in a room heated to a temperature of 160° Fahrenheit, I then apply another or finishing coat, composed as follows: I take one gallon of linseed-oil, (or any other drying-oil,) four ounces red lead, one ounce of acetate of lead, or their equivalents. I boil them together in a vessel holding about four or five gallons until it will "string" two or three inches, then remove it from the fire, and, when it has cooled sufficiently to allow it, I add one quart of camphene or naphtha and one quart of the gutta-percha liquid before prepared.

Any desired color may be obtained by adding to this varnish the proper coloring-pigments.

I apply this varnish in the same or similar manner as the first coats of the gutta-percha liquid, and dry it in the same manner as the first coats.

I produce my compound without sulphur or any vulcanizing process or compound, which is one of its chief advantages, as my compound has none of the offensive odor always attending vulcanizing compounds and vulcanized goods.

My oil is truly a drying-oil; but the ingredients I use and compound with it alone make it valuable as a finishing coat for my waterproof compound.

One other object which I have in thus compounding my varnish or finishing coat is that by applying clear camphene or spirits of turpentine to the coat after it has been dried it will soften and become adhesive, so that I am enabled to "flock" any of my coated materials after they have been thoroughly dried.

I am aware that boiled or drying oils have been used in water-proof compounds; but in all cases it has been required that sulphur should form one of the ingredients, as in the patent of Wm. F. Shaw, August 12, 1856, where "it is essential that sulphur be present for the oil to combine with." The same may be said of Parkes's English patent, Specification No. 2,359 of 1855, where chloride of sulphur is required to produce the result specified. Therefore I do not claim the use of drying-oils when combined with sulphur, sulphured compounds, or sulphured goods or fabrics; but What I do claim as new and useful, and desire to secure by Letters Patent, is—

1. A water-proof compound composed, in the manner described, of gutta-percha and camphene or naphtha, for the purpose and substantially as herein set forth.

2. The compound produced by combining with the liquid gutta-percha, prepared as described, benzoin, camphene, and boiled vegetable oil, in the manner and for the purpose substantially as herein set forth and described.

EDWIN L. SIMPSON.

Witnesses:
JOHN E. EARLE,
J. W. POST.